Oct. 8, 1957 J. P. FAY 2,809,238

APPARATUS FOR AND METHOD OF RECORDING

Filed Sept. 30, 1953

INVENTOR

James P. Fay

BY Johnson and Kline

ATTORNEYS

United States Patent Office 2,809,238

Patented Oct. 8, 1957

2,809,238

APPARATUS FOR AND METHOD OF RECORDING

James P. Fay, Norwalk, Conn., assignor to Teletrak Corporation, Wilmington, Del., a corporation of Delaware Application September 30, 1953, Serial No. 383,327

15 Claims. (Cl. 179—100.2)

This invention relates to apparatus for and method of recording and to a continuous, tubular, flexible tape for use therein.

Heretofore, it has been impractical to record high frequency video signals on a tape, such as a magnetic tape, because in order to secure proper resolution of the signal the linear velocity of the recording track would have to be increased to such speeds as would make it practically impossible to attain, and the amount of tape necessary under such circumstances would be prohibitive.

The present invention overcomes these difficulties by providing a recording means and method of recording which permits high speed recording on tape and which reduces substantially the amount of tape required for a given program.

This is accomplished by providing a tubular, flexible tape with a record-receiving surface and providing a recording device which is adapted to rotate around the tubular tape as it is fed through a recording station so as to generate a spiral track on the surface of the tubular member.

In the preferred form of the invention the tubular tape is stored in a collapsed flat condition and as it passes through the recording station is expanded into cylindrical form at such time as the recording is made thereon. The tape is then again flattened and stored.

Also, according to the present invention, monitor means are provided for controlling the relative movement between the tape and recording device so as to properly space the spirals on the surface of the tape so that when it is desired to erase the track on the tape or to play back the recording the spirals will be accurately positioned so that a revolving erasing head or play back head will follow the same spiral and erase or reproduce the signal as required.

The signal recorded can be made up of several component parts which may be separated out by suitable means when it is desired to reproduce the recording.

The present invention not only is applicable to high speed recording but may also be used at lower speeds for recording lower frequency signals in which case a greater amount of record can be applied for a given length of tape, thus insuring a long playing period with a smaller supply of tape.

Other features and advantages of the invention will be apparent from the specification and claims when considered in connection with the drawings in which:

Figures 1, 2, 3, 4, 5, 6:
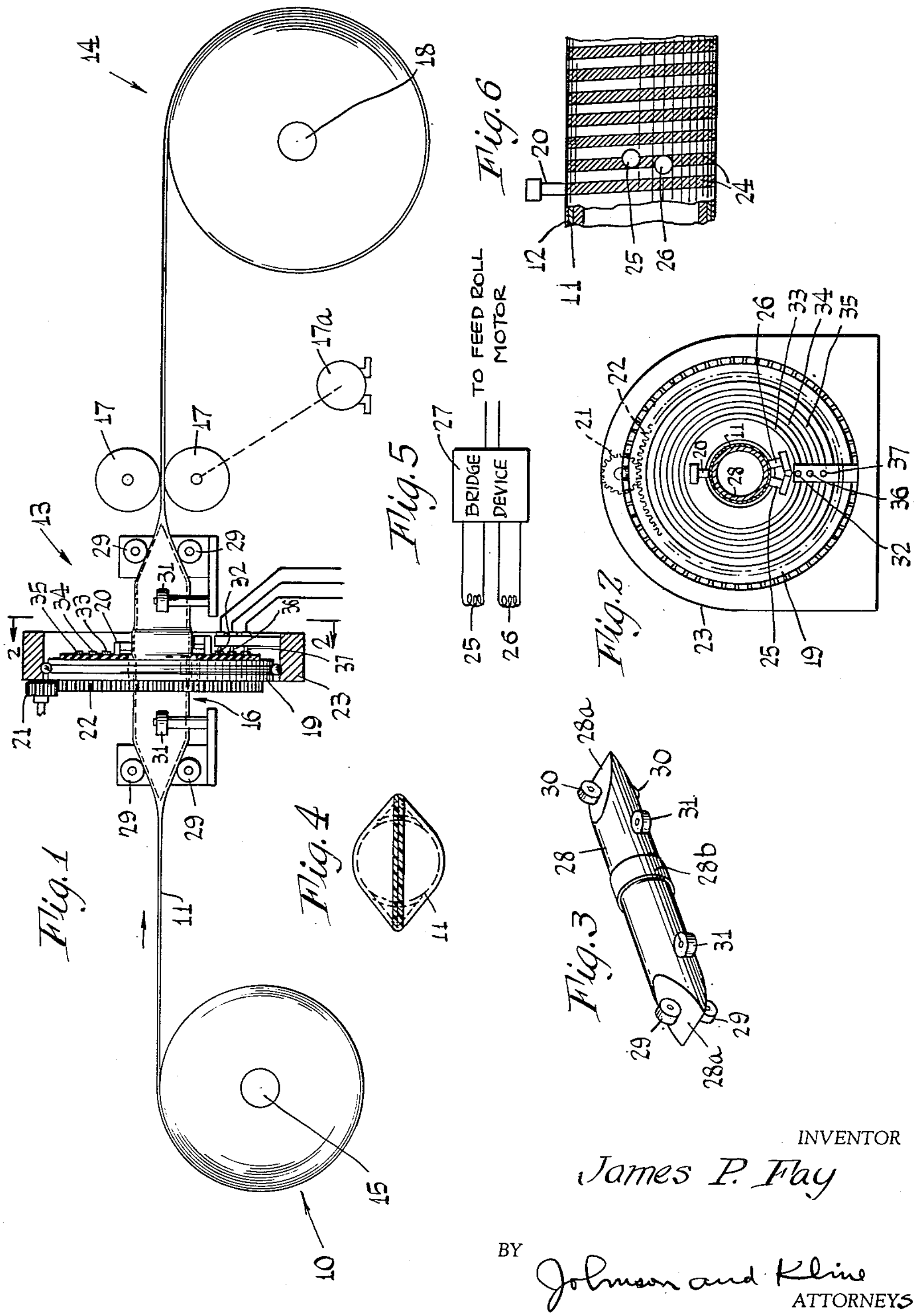
Figure 1 shows a diagrammatic view of the device of the present invention.
Fig. 2 is a view taken along lines 2—2 of Fig. 1.
Fig. 3 is a perspective view of the expander device.
Fig. 4 is a section of the tape showing the tape passing over the expanding device.
Fig. 5 is a diagrammatic view of the monitor circuit.
Fig. 6 shows the relation of the monitor head to the recording head.

As shown in the drawings, the device of the present invention comprises a supply means 10 for a continuous, tubular, flexible member 11 or a tape having on its outer surface record-making or record-receiving material 12. While the tape may be made of paper or the like and the record-receiving material may be a photographic film or other similar material, it is herein illustrated as being formed of a flexible plastic material such as is used in standard magnetic tape recordings and the record-receiving layer formed of a magnetizable material. The tape passes through a recording station 13 and is fed to a take up 14. In the herein illustrated form of the invention the tape is stored in flat condition on a reel 15 to be payed off in any suitable manner. As the tape passes through the recording station it is expanded by a floating expander 16 so that it is in cylindrical form at the time the recording is made. A pair of driven feed rolls 17 driven by motor 17a engages the tape to advance it through the recording station and a suitable take up reel 18 stores the recorded tape in flat condition. The take up reel is driven by any suitable slip clutch or variable speed drive (not shown) which will take up the material as it is fed through from the feed rolls without unduly tensioning the material.

Mounted at the recording station is a rotor 19 having thereon a recording device or head 20.

In accordance with the present invention a gear 21 driven by any suitable means engages a gear 22 on the rotor to rotate the rotor. The rotor is mounted on suitable bearings 23 so as to extend around the expanded tape so that the recording device when energized will produce on the longitudinally moving tape a spiral track 24 as shown in Fig. 6. In the preferred form of the invention the rotor is driven at constant speed in order that the play back will reproduce faithfully the original frequencies. In view of this, the feed of the tape by the rollers 17 is varied in accordance with monitoring means in order to produce the proper spacing of the spiral track on the cylindrical surface.

Thus it will be seen that by using a tubular tape of the proper diameter and by providing closely adjacent spiral tracks thereon, I have been able to produce large lineal footage of track on a minimum amount of tape.

Ordinary speech requires a linear velocity of the head over the surface of the tape of 3¾ inches per second while the reproduction of high fidelity music would require a velocity of 15 inches per second. Such tape speeds can be readily acquired with existing equipment. However, the reproduction of high frequency signals, such as video signals, would require a velocity of the head over the surface of the tape of 250 miles per hour. This can be achieved, according to the present invention, by using a tape having a diameter of four inches and by rotating the rotor carrying the head at a speed of approximately 20,000 R. P. M. and by feeding the tape so as to produce ten turns per inch. In order to accomplish this, the tape would have to be fed longitudinally through the recording station at a speed of 33 inches per second. All of these speeds are well within the operating limits of my device.

While the tape may be monitored in many ways, in accordance with the present invention a pair of monitoring heads 25, 26 are adjustably mounted on the rotor and their position so adjusted that they partially overlie the track a predetermined space ahead of the track being formed by the recording head, as shown in Fig. 6. Preferably, the monitor heads are arranged so that normally the heads overlie the track and receive an equal signal therefrom. The signals from the monitor heads are fed into a bridge device 27 and the resultant corrective current is fed to the motor 17a driving the feed rollers. Thus when the track is in proper relation, no corrective signal is transmitted to the motor. However, should the track shift from the proper position, the monitoring heads would be unequally energized and cause the bridge device to send a corrective current to the motor to speed up or retard the motor, as the case may be, and put the tracking back into proper relation.

While the tape may be expanded in any suitable manner as it passes through the recording station, it is at present preferred to employ a substantially cylindrical expander 28, as shown in Fig. 3, which has tapered ends 29*a* and which is adapted to be positioned within the tape so as to engage the inner surface of the tape and expand it into its fully cylindrical shape. If desired, the expander can have a short band portion 28*b* which is substantially equal to the internal diameter of the tubular member so that the member will be expanded completely at the time the recording is made thereon. It is at present preferred to make the expander of non-magnetic material, such as brass or the like, or from suitable plastics, such as Nylon or Teflon and may be made hollow in order to reduce the weight thereof to a minimum.

The expander is retained in proper position by having pairs of rollers 29, 30 disposed on the outside of the tape adjacent each of the tapered ends 28*a* and at a point inwardly from the outermost diameter of the expander so that the expander is held from longitudinal movement with the tape as the tape passes thereover between the expander and the rollers. Side rollers 31 are also provided at the side of the expander to assist in centering the tape so that it passes axially of the rotor. All of the rollers may be removably mounted so that the expander can be removed to be inserted into the tubular member as required.

While the signal to be recorded may be transmitted from a suitable microphone, television camera or other pick up to the recording head by either an induction or capacitance coupling, in the herein illustrated form of the invention it is supplied to the recording head by means of brushes 32 engaging ring contact 33 on the rotor. Similarly, the monitoring signals picked up by the monitoring heads are taken from the rotor by means of rings 34, 35 and brush contacts 36, 37.

In accordance with the preferred form of the invention the signal to be recorded may be made up of several component parts, i. e., a video signal, an audio signal and, if desired, a monitoring signal. It may include, for example a 5 megacycle monitoring signal which is picked up by the monitoring heads 25, 26 to control the tracking of the record. It can include a 0 to 4.5 megacycle video signal and a 4.7 megacycle$\pm$150 kilocycle F.M. carrier for the audio signal.

After the tubular record has been made it can be passed through a play back means similar to the recording means except that a play back head is mounted on a rotor, similar to the rotor herein disclosed, and the record reproduced. Also, the record on the tape may be erased by means of a suitable erasing head, not shown, and the record re-made should this be necessary.

In accordance with the present invention it will be seen, therefore, that I have provided not only a novel recording means and method of recording but have provided a novel recording tape and record formed thereby.

Variations and modifications may be made within the scope of the claims and portions of the improvements may be used without others.

I claim:

1. In a recording device, means supplying a continuous tubular, flexible member having an outer surface of record-making material thereon; means feeding the tubular member past a recording station; and means at the recording station mounting a recording device for relative rotation about the axis of the tubular member, said recording device activating the surface to produce a spiral record track thereon in accordance with the energization of said recording device.

2. In a recording device, means supplying a continuous, flat, tubular, flexible member having a magnetizable material on the outer surface; means feeding the tubular member past a recording station; means expanding said tubular member into a cylinder while passing through the recording station; means mounting a recording device for rotation about the axis of the tubular member to produce a spiral magnetized track on the magnetizable surface in accordance with the energization of said recording device; means monitoring said track on the tubular member; and means actuated by said monitoring means for controlling the relative movement of the member and recording device to properly space the track on the member.

3. In a recording device, means supplying a continuous, flat, tubular, flexible member having record-receiving material on the outer surface; means feeding the tubular member past a recording station; a floating expander disposed within the tubular member; means maintaining the floating expander in a predetermined position in said recording station; and means at the recording station mounting a recording device for rotation about the axis of the expanded tubular member to produce a spiral record track on the record-receiving surface in accordance with the energization of said recording device.

4. In a recording device, means supplying a continuous, flat, tubular, flexible member having a magnetizable material on the outer surface; means feeding the tubular member past a recording station; means expanding said tubular member into a cylinder while passing through the recording station, said means comprising a non-magnetic expander disposed within the member and having at least a portion of substantially the diameter of the inside of the tubular member; means on the outside of the tubular member adjacent the ends of the expander and located inwardly of said diameter of the expander and floatingly holding said expander against movement from said expanding position; and means mounting a recording device for rotation about the axis of the tubular member to produce a spiral magnetized track on the magnetizable surface in accordance with the energization of said recording device.

5. In a recording device, means supplying a continuous, tubular, flexible member having an outer surface of record-making material thereon; means feeding the tubular member past a recording station; means engaging and supporting the flexible member as a cylinder at the recording station; a rotor surrounding the supported member and having a recording device mounted thereon; and means rotating the rotor to carry the recording device around the tubular member, said recording device activating the surface of the member to produce a spiral track thereon in accordance with the energization of said recording device.

6. In a recording device, means supplying a continuous, flat, tubular, flexible member having a magnetizable material on the outer surface; feed rolls engaging the tubular member and feeding the member past a recording station; means at the recording station expanding said tubular member into a cylinder; means, including a rotor, mounting a recording device for rotation about the expanded tubular member to produce a spiral magnetized track on the magnetizable surface in accordance with the energization of said recording device; means monitoring said track on the tubular member; means actuated by said monitoring means for controlling the speed of the feed rolls and the relative movement of the member and recording device to properly space the track on the member; and means taking up the recorded member.

7. In a recording device, a reel having a continuous, flat, tubular, flexible member wound thereon, said member having a magnetizable material on the outer surface; means feeding the tubular member from the reel past a recording station; means at the recording station disposed within the member and expanding said tubular member into a cylinder while passing through the recording station; means mounting a recording device for rotation about the axis of the tubular member to produce a spiral magnetized track on the magnetizable surface in accordance with the energization of said recording device; means monitoring said track on the tubular tape; means actuated by said monitoring means for controlling the relative movement of the tape and recording device to properly space the track thereon; and a take up reel for winding up the flat tubular member after said member passes the recording device.

8. In a recording device, means supplying a continuous tubular, flexible member having a magnetizable material on the outer surface; means feeding the tubular member past a recording station; means expanding said tubular member into a cylinder while passing through the recording station; a rotor mounting a recording device for rotation about the axis of the tubular member to produce a spiral magnetized track on the magnetizable surface in accordance with the energization of said recording device; monitoring means on said rotor and cooperating with said track on the tubular member; and means actuated by said monitoring means for controlling the relative movement of the tape and recording device to properly space the track on the member.

9. A recording tape comprising a preformed continuous flexible member of tubular cross-section and of indefinite length and having record-receiving material thereon, said member being collapsible into a substantially flat ribbon for storage and being expansible to receive a recording thereon.

10. A recording tape comprising a preformed continuous flexible member of tubular cross-section and of indefinite length and having magnetizable material thereon, said member being collapsible into a substantially flat ribbon for storage and being expansible to receive a recording thereon.

11. A record comprising a preformed continuous flexible tape of tubular cross-section and of indefinite length and having a spiral record track formed thereon, said member being collapsible into a substantially flat ribbon for storage and being expansible to receive a recording thereon.

12. A record comprising a preformed continuous flexible member of tubular cross-section and of indefinite length and having a magnetized spiral record track formed on the outer surface thereof, said member being collapsible into a substantially flat ribbon for storage and being expansible to receive a recording thereon.

13. The method of recording a signal on a preformed continuous flexible recording tape of tubular cross-section and indefinite length at a recording station having a recording head therein, the steps of feeding the preformed tubular tape in collapsed condition from a supply to the recording station, expanding the tape into cylindrical form as it is fed through the recording station, supplying a signal to the recording head and recording a spiral signal track on the tape, and thereafter collapsing the recorded tubular tape.

14. The method of recording a signal on a preformed continuous flexible tape of tubular cross-section and indefinite length and having record-receiving material thereon at a recording station having a recording head therein, the steps of feeding the continuous preformed tape in collapsed condition from a supply to the recording station, expanding the tape into cylindrical form as it is fed through the recording station, moving the recording head in a path around the axis of the expanded tubular tape, supplying a signal to the recording head and recording a spiral signal track on the expanded tape, and thereafter collapsing the tubular tape.

15. The method of recording a signal on a preformed continuous flexible tape of tubular cross-section and indefinite length and having record-receiving material on the outer surface thereof at a recording station having a recording head therein, the steps of feeding the tape in collapsed condition from a supply to the recording station, expanding the tape into cylindrical form as it is fed through the recording station, moving the head around the expanded tape in a plane perpendicular to the axis of the tape, energizing the head and recording a spiral signal track on the moving tape, monitoring the recorded signal track on the tape and controlling the feed of the tape and movement of the recording head to maintain proper spacing of the recorded track on the tape, and taking up the recorded tape.

References Cited in the file of this patent

UNITED STATES PATENTS

| | | |
|---|---|---|
| 2,245,286 | Marzocchi | June 10, 1941 |
| 2,343,114 | Neumann | Feb. 29, 1944 |
| 2,535,480 | Begun | Dec. 26, 1950 |